FIG. 1b

Sept. 6, 1960 J. VALLOJERA 2,951,399
AUTOMATIC TRANSMISSION
Filed Jan. 13, 1958 4 Sheets-Sheet 3

INVENTOR
José Vallojera
BY
ATTORNEYS

Sept. 6, 1960      J. VALLOJERA      2,951,399

AUTOMATIC TRANSMISSION

Filed Jan. 13, 1958      4 Sheets-Sheet 4

INVENTOR
José Vallojera

United States Patent Office 2,951,399
Patented Sept. 6, 1960

2,951,399
AUTOMATIC TRANSMISSION
José Vallojera, Esquina Cochera, Edificio Urumea, Apt. 2, Caracas, Venezuela
Filed Jan. 13, 1958, Ser. No. 708,500
24 Claims. (Cl. 74—751)

This invention relates to improvements in automatic transmission mechanisms, more particularly for automotive vehicles, including in combination an automatic transmission per se provided with an automatic double-acting clutch and a reverse mechanism.

The principal object of the invention is to provide an automatic transmission mechanism having great convenience and economy, and which does not require the use of the usual pedals, levers, push or electric buttons to effect any of its operations.

The automatic transmission of the invention is constructed and arranged to change speed gradually by the resistance offered by the driving motor and preferably includes an overdrive as well as a reverse mechanism which is also automatic. The automatic transmission and reverse mechanism is operable automatically without the use of a selective gear shift or other equivalent manual means. The operation of the reverse mechanism may, however, be effected by an electric switch means if desired, for reasons of economy.

The clutch included in the transmission mechanism is a centrifugal double-acting clutch mechanism which acts automatically without the use of clutch pedals or other outside controls, and cooperated with the transmission proper and reversing mechanism during speed changes, which are effected gradually and smoothly without noise or jerks.

The automatic mechanisms of the invention include means for automatically providing a neutral point, thereby making it unnecessary for the driver of the vehicle to set the clutch in neutral position, because the neutral point is set or achieved automatically. In the preferred embodiment of the invention, when applied to an automotive vehicle, it is merely necessary for the operator to attend to or use the steering wheel, the accelerator pedal and the brake pedal to control the operation of the vehicle.

The double-acting clutch and also the transmission proper, of the invention are entirely mechanical and require only a lubricating grease for lubrication, and no oil. These mechanisms are simple, economic constructions, economic to repair and operate, and in operation, give a smooth transition from one speed or gear ratio to another without sudden thrusts or jerks, which are common with transmissions provided with the usual gear arrangements.

These and other novel features of the invention will be described in detail hereinafter in conjunction with the accompaying drawings forming a part of this application.

In the drawings:

Fig. 2 is a cross-sectional view taken on the line 2—2 of Fig. 1a;

Fig. 3 is a broken longitudinal sectional view taken on the irregular line 3—3 of Fig. 2, showing details mostly to the left of the line 2—2 in Fig. 1a;

Fig. 5 is a cross-sectional view taken on the line 5—5 of Fig. 1a.

The drawings show in considerable detail one constructional form and arrangement of the elements of the automatic transmission unit referred to above, which has been built and successfully operated. It is to be understood that certain variations may be made in the gearing and other relationships to provide transmission mechanisms for particular speeds and conditions of use.

Figure 1A:
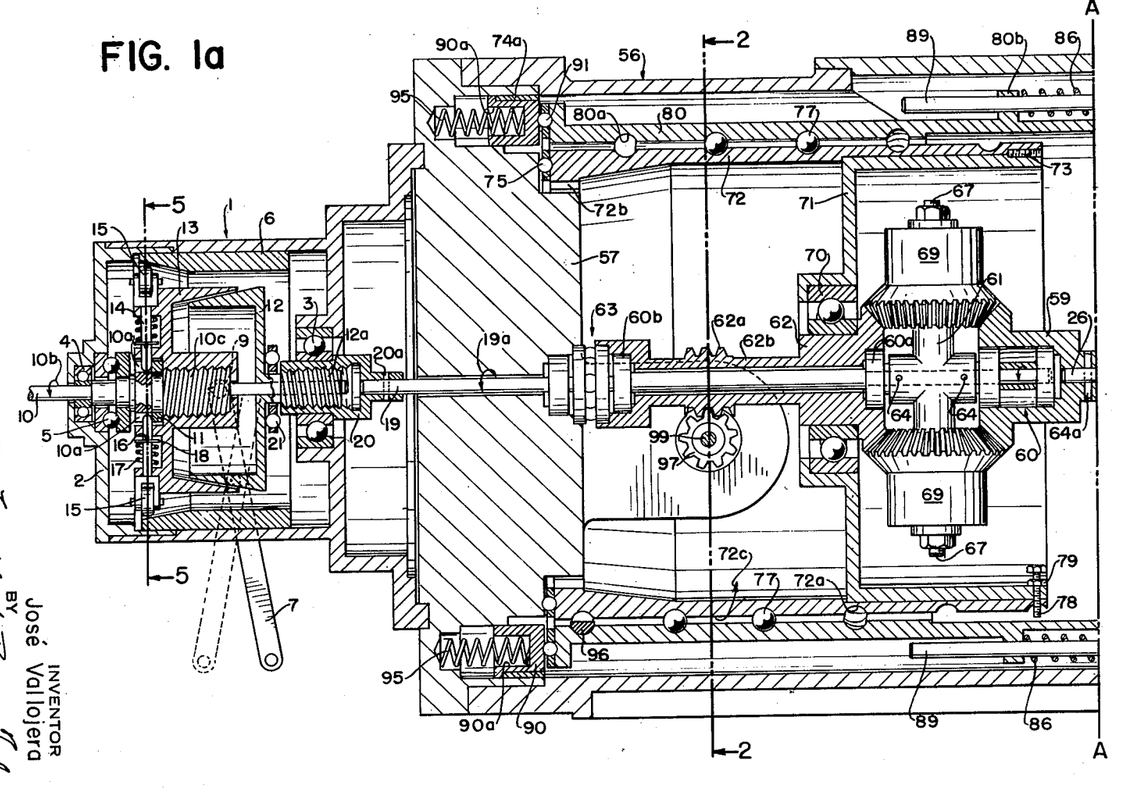
Figs. 1a and 1b, when arranged end to end, constitute a longitudinal vertical sectional view through an automatic transmission according to the invention, including the double-acting clutch mechanism, the transmission proper and the reverse mechanism.
Figure 1B:
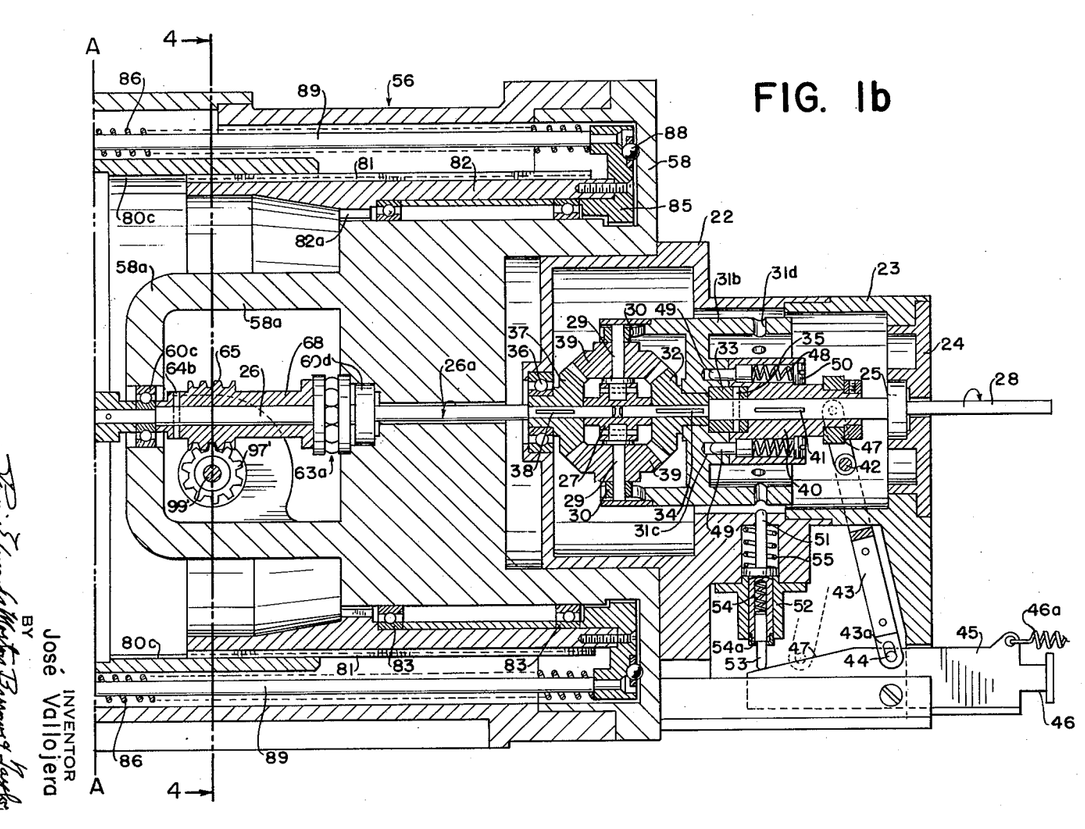

Referring to Figs. 1a and 1b of the drawings, it will be noted that the clutch mechanism to the left, the transmission proper in the central portion and the reverse mechanism at the right are included in separate housings or casings, for economy and convenience, although the mechanisms may be arranged in a single casing, if desired. The double-acting clutch mechanism is located in a housing 1 at the left, the transmission mechanism proper in a tubular housing 56 and the reverse mechanism in a housing 22 at the right. These housings are secured together and the enclosed mechanisms are connected in series as shown, and for convenience will be separately described.

THE DOUBLE-ACTING CLUTCH MECHANISM

Figure 5:
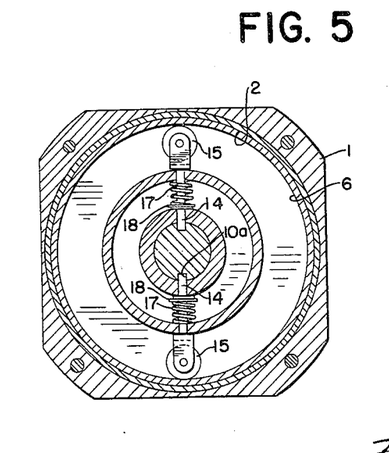

The housing 1 is provided with an end cover 2, through which the power input shaft axially extends. The mechanism arranged in the housing 1, as shown in Figs. 1a and 5 includes axially arranged ball bearing units 3, 4 and 5, the latter of which is a thrust bearing. A slidable ring or sleeve 6 is fitted inside the cylindrical surface of the housing 1 for longitudinal reciprocation by a forked lever 7 pivoted on two threaded pivot studs secured in the housing 1. The outer end of the lever 7 is arranged for connection, and in practice is connected to the hand brake of the vehicle, while the two forks of the lever 7 extend on the respective sides of the housing 1 and are respectively connected to the reciprocable sleeve 6 by shafts or studs 9 extending through longitudinal slots, not shown, in the opposite sides of the housing wall and threaded into the sleeve 6.

The clutch mechanism is coupled to the motor of the vehicle by means of a power input shaft 10 extending axially through the cover 2 and supported by the bearing units 3 and 4. A shoulder on the shaft bears against the thrust bearing 5. In operation the shaft 10 is rotated in the direction of the arrow 10b. A cylindrical enlarged part of the shaft 10 is provided with opposite longitudinal grooves 10a arranged to receive the respective inner ends of radially-extending centrifugally-acting snap bolts 14. To the right, the shaft 10 is provided with a left-hand thread 10c, which may be square cut, and a ring 11 covering the mouth of the thread is welded onto the shaft between the thread and the grooves 10a to facilitate the entry of the pins 14 into the grooves. At the right of the thread 10c, the shaft 10 is of smaller diameter where it extends into and terminates in an axial bore in a male clutch cone or drum 12 and its hub portion.

The cone 12 is provided with a conical-shaped peripheral engagement surface, as shown, which is arranged for engagement with the matching inner surface of the female clutch cone or drum 13, having a hub portion threaded on the thread 10c. The snap bolts 14 are carried by the drum 13 by spaced forwardly-extending annular flanges, and each terminates in a rectangular-shaped fork in which a roller 15 is mounted for rotation on the inner, forwardly-tapering surface of the sleeve 6. A plane face on each of the forks slides on the adjacent face of the drum 13 and prevents rotation of the bolts 14 and rollers 15. The forks and rollers on the bolts 14 serve as weights subject to centrifugal action. The bolts 14 are secured by cotter pins 16 which in turn support compression springs 17 against the outer flange by means of washers 18. The inner ends of the bolts 14 are shown in the grooves 10a.

The cone drum 12 integrally includes a hub extension 12a rotatably mounted relative to the shaft 10 and provided with a right-handed male thread, which may be square cut, engaging in a matching female thread in a shouldered sleeve 20 mounted for rotation in and guided by the bearing unit 3, which also supports the end of the shaft 10 and the drum 12. A ball bearing race 21 is arranged between the head of the drum 12 and the end of the sleeve 20 to facilitate release of the parts 12 and 20 after they have been drawn together during operation.

The sleeve 20 is connected to a shaft 19 by a cotter pin 20a, the shaft 19 extending into the housing 56 and being rotatable in the direction of the arrow 19a.

*Operation of the clutch mechanism*

When the vehicle equipped with the mechanism of the present invention is stopped and the hand brake applied, with the lever 7 in the full line position, the vehicle is automatically in neutral, or set at a neutral point, even if the accelerator pedal is pressed down all the way. When the inner ends of the snap bolts 14 are seated in the grooves 10a of the shaft 10 by the pressure of the springs 17, the shaft 10 is rigidly connected with the female cone drum 13, and no clutch action takes place. This clutch release position is obtained whenever the sleeve 6 is displaced toward the left, as when the hand brake is applied, for example when the vehicle is stopped. In this position the motor may be stopped or running at idling or higher speeds. When the vehicle is stopped, with the hand brake applied, and the motor running at driving speed, the snap bolts 14 cannot move out of the grooves 10a because the rollers 15 are in engagement with the inner surface of the sleeve 6.

With the motor running and the shaft 10 turning, a clutching action is obtained by releasing the hand brake, thereby shifting the lever 7 to the dotted line position and moving the sleeve 6 to the right out of the path of the rollers 15. In this position of the sleeve 6, the snap bolts 14 and rollers 15 are free to move outwardly by centrifugal action, but they are so adjusted and mounted that the rollers do not engage the inner surface of the housing 1. It is desirable that the resistance of the springs 17 be so calibrated that they permit outward movement of the bolts 14 and rollers 15 when the speed of the shaft 10 exceeds 500 r.p.m., that is, exceeds the idling speed.

Whenever the sleeve 6 is displaced to the right and the motor and shaft 10 are operated at an idling speed, the mechanism is set for clutch engagement, but the bolts 14 are not moved out of the grooves 10a until the idling speed is exceeded. When the bolts 14 are moved out of the slots in the shaft 10 by centrifugal action, the female cone drum 13 is no longer rigidly connected to the shaft 10, and since the left-hand threaded connection with the shaft 10 is not sufficient for rotating the drum 13 in unison with the shaft 10, and because of the inertia of the drum 13 and the left-handed thread, the cone drum 13 loses peripheral speed relative to that of the shaft 10, thereby moving the cone drum to the right. The faster the shaft 10 is rotated, the more rapidly the clutch drum 13 operates, and its movement toward the right brings it into engagement with the cone drum 12, which up to this point has been immobile. The cone drums, therefore, are rigidly connected by means of their clutch cones, which causes the cone drum 13 to lose additional peripheral speed in overcoming the inertia of the cone drum 12 on engagement.

This displacement of the cone drums 12 and 13 to the right causes the thread 12a to move into the thread of the sleeve 20 to effect a positive engagement with the shaft 19. In this operation, it will be understood that the cone drum 12 can move only a limited distance to the right until the thread 12a is threaded up in the sleeve 20, which is engaged by the bearing unit 21. The rotation of the shaft 10 is, therefore, communicated to shaft 19 and through the remainder of the transmission mechanism, to the automobile.

If during the operation of the vehicle, the acceleration pedal is released, the motor gradually reduces its speed down to the idling point, during which operation the female cone 13, which formerly operated at the speed of the shaft 10, rapidly unscrews on the shaft 10 and is thereby separated from the male cone 12 and again assumes the reduced speed of the shaft 10, whereupon the bolts 14 engage the grooves 10a. It is to be understood that the drum 13 and the shaft 10 are correlated and synchronized in such a way that the bolts 14 are in position to enter the grooves 10a when the cone drum 13 is completely screwed up on the thread on the shaft 10. The band 11 prevents entry of the bolts 14 until the drum 13 is completely screwed up on the thread of the shaft 10.

Since, in the above speed reducing operation, the shaft 19 retains its speed at the time of clutch release, and since it is driven by the inertia of the moving vehicle, the male cone drum 12 will now be unscrewed from the sleeve 20, because of its inertia with respect to the shaft 19 upon being released from the cone drum 13. This unscrewing action produces an axial displacement of the cone drum 12 until it again comes into engagement with the female cone drum 13 to form a rigid connection. The cone drum 13 will, therefore, acquire the same speed as the drum 13 and the shaft 10, and the vehicle will be braked by the motor, thereby providing the double action of the clutch during operation. In this operation it will be understood that the male cone will follow the female cone almost immediately upon their initial release.

As pointed out above, the male and female cones 12 and 13 remain engaged during the braking of the automobile by the motor. After the vehicle has been stopped and the hand brake applied and with the shaft 19 immobile, the female cone 13 no longer transmits its force to the male cone, even though they are connected, since the male cone 12 starts its movement away from the female cone by the action of the threaded engagement between the thread 12a and the sleeve 20. Therefore, the cone drum 12 is drawn out of engagement with the cone drum 13.

While the operation of the lever 7 is advantageously correlated with that of the hand brake, it may be operated by other suitable means.

THE TRANSMISSION MECHANISM PROPER

The transmission mechanism is mounted in the tubular housing 56 provided with a cover or end block 57 at the left and a cover or end block 58 at the right, both of which serve to support bearings and other mechanisms, as shown in Figs. 1a, 1b, 2, 3 and 4. The shaft 19 rotated by means of the clutch mechanism, as described, terminates in the hub portion of a bevel gear member 59, one of four bevel gears of a differential unit. The right end of the shaft is supported in ball bearing units 60 located in the member 59. A cross head 61 located in the differential gear unit is fixed to the shaft 19 by cotter pins 64. To the left of the cross head 61, the shaft carries a bearing unit 60a mounted in the opposite bevel gear member 62, mounted for rotation on the shaft 19. The left hand of the member 62 and the shaft 19 adjacent thereto are supported by bearing units 60b. A thrust bearing unit 63 is located between the end block 57 and the left end of the member 62, which includes a relatively long sleeve 62b. The shaft 19 rotates independently of the part 62 and at equal or higher speeds in the same direction.

An axially arranged shaft 26 at the right of the shaft 19 has its left end secured axially in the hub part of the bevel gear 59 by means of cotter pins 64a. The shaft 26 is supported in a bridge support 58a carried by the end block 58 by means of a ball bearing unit 60c and in the block 58 by means of a second ball bearing unit 60d. Within the bridge support 58a, a sleeve 68 is fixed to the shaft 26 by cotter pins 64b, the sleeve being provided with a worm gear 65 meshing with a gear 97'. This sleeve and the worm 65, as well as the shaft 26, are axially supported with respect to the head 58 by means of a thrust bearing 63a.

The cross head 61 carries two diametrically opposed attached shafts 67, each carrying a satellite bevel pinion 69 freely rotatable on ball bearing units mounted on the shafts, and not shown. These conical-shaped pinions or wheels 69 have an equal number of teeth and the conical wheels or bevel gears 59 or 62 also have the same number of teeth. These four bevel gears can all have the same number of teeth or a different number of teeth, provided that in the latter case they are arranged in pairs. For example, the pinions 69 are one pair and the gears 59 and 62 are another pair.

The member 62 at the position of the bevel gear thereof is mounted for rotation in a ball bearing unit 70 which in turn is mounted in a cylindrical support 71 attached to a rotatable tubular sleeve member 72 by means of four key type set screws 73.

The tubular sleeve member or "screw" 72 at its left end carries a rim of interior gear teeth 72b and on its outer surface it is provided with a helicoidal right-hand high pitch channel or thread 72a of semi-circular section for the purpose of retaining a complete turn of calibrated steel balls 77. The channel 72a and the balls 77 in effect form a right-hand thread. In order to smooth out the radial push toward the left of the sleeve 72 with respect to the head 57, a thrust ball bearing unit 75 is provided between these members. A stop 78 is provided at the right end of the channel 72a for retaining the ball 77, this stop comprising a screw with its lock nut 79.

A second tubular sleeve or "nut" 80 surrounding the sleeve 72 is provided with a helicoidal channel of semi-circular section and of right-hand pitch constituting a thread 80a similar to the channel 72a in the sleeve 72, for accommodating the set of steel balls 77. A stop 96 is provided in the left end of the channel 80a to prevent escape of the balls 77.

The tubular "nut" 80, which may be displaced toward the right, whether rotating or not, carries at its right inside end two diametrically opposed grooves 80c arranged to accommodate splines 81 which are carried by a rotatable sleeve member 82, arranged substantially opposite the sleeve 72 and mounted for rotation on the block 58 by means of ball bearing units 83. The rotatable sleeve 82 is provided with an internal ring gear 82a with the same number of teeth as the gear 72b on the rotatable sleeve 72. These sleeves may be provided with a different number of gear teeth, if desired. The right end of the rotatable sleeve 82 is attached by bolts, as shown in Fig. 1b, to an annular ring member 85 mounted in an annular recess in the head 58. This member 85 is biased by compression springs 86, the thrust of which is taken up by a thrust ball bearing unit 88.

Figure 4:
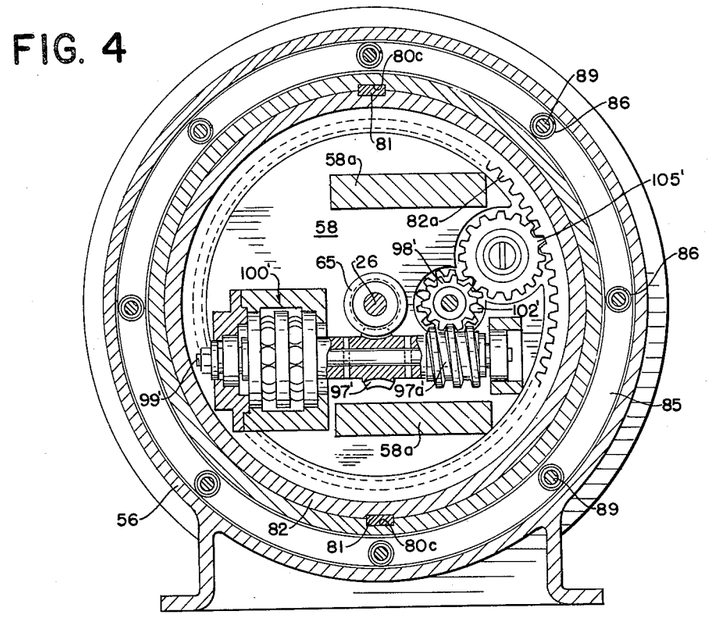
Fig. 4 is a cross-sectional view taken on the line 4—4 of Fig. 1b.

The unit formed by the rotatable sleeve 82 and the ring 85 is specially connected in its movements with the rotatable sleeve 80 in such a way that while the parts 82 and 85 can only rotate, the part 80 can rotate and also be displaced axially to the right or to the left. These movements of the rotatable sleeve 80 may take place simultaneously. The keys 81 and grooves 80c connect the sleeves 80 and 82 and rods or shafts 89 riveted to the ring 85 extend through the compression springs 86 and through openings in a cylindrical projection 80b on the sleeve 80. A number of springs and rods are provided for biasing the rotatable sleeve 80 toward the left, as shown in Fig. 4. Since the tubular nut or sleeve 80 can be displaced toward the left, while being rotated, it produces an axial thrust, and for softening this thrust, a ring part 90 is provided with an intervening thrust bearing of calibrated steel balls 91 mounted on the left end of nut 80. The ring 90 can be displaced axially toward the left but is provided with a stop 74a to limit its movement toward the right. Movement of the ring 90 toward the left is opposed by a plurality of spaced compression springs 95 engaged in spaced holes 90a in the ring 90. These springs dampen or cushion the thrust or push of the rotatable and axially displaceable sleeve member 80.

The rotary movement of the bevel gear of the member 62 included in the differential gear unit is transmitted to the rim gear 72b of the rotatable sleeve 72 by two sets of helicoidal and one set of straight gears, with an intermediate pinion. To begin with, motion is transmitted by the shaft 19 in the direction of the arrow 19a to the cross head 61 carrying the satellite pinion gears 69. These satellites transmit this motion to the conical or bevel gear 62 and thereupon to the conical gear 59, in a known manner. The worm 62a on the sleeve 62b receives the motion of the gear 62 and transmits it to the helicoidal gear wheel 97.

Figure 2:
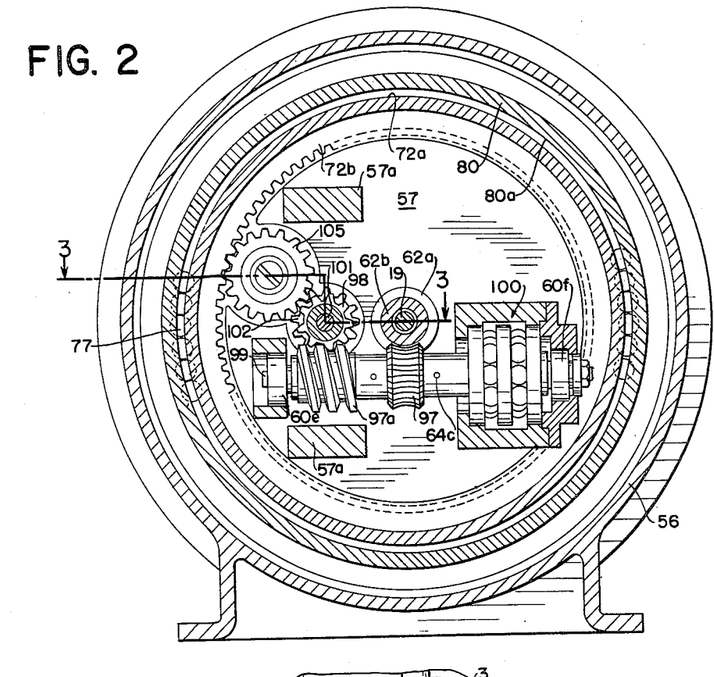
Figure 3:
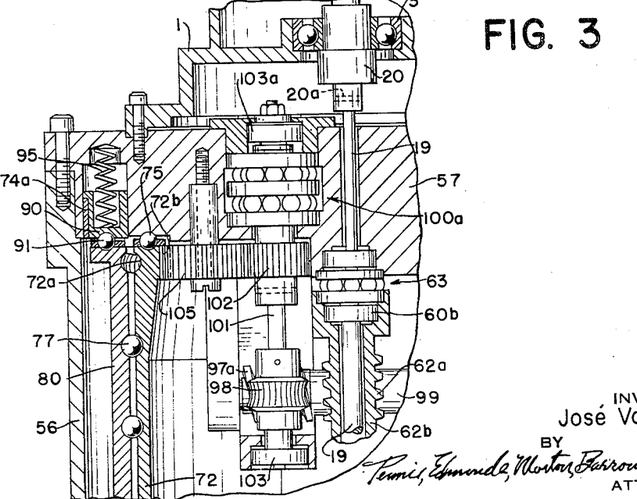

The members 62a and 97 are shown in Fig. 1a, but the connecting gearing is shown in Figs. 2 and 3 supported on the head 57 and by a bridge 57a thereon. The sleeve or mounting for the gear 97, as shown, also carries a worm 97a engaging a helicoidal gear wheel 98. The unit, together with the wheels 97 and 97a is fitted on a shaft 99 and attached thereto by cotter pins 64c. The radial and axial movement of the unit 97 and 97a is smoothed and absorbed by ball bearing units 60e, 60f and a thrust bearing 100. The gear wheel 98 is fixed to a shaft 101 (Fig. 3) by means of a cotter pin, not shown, and this shaft carries a pinion 102, which is also fixed to the shaft. The radial and axial movement of this unit is smooth and taken up by ball bearing units 103, 103a and a thrust bearing unit 100a. The pinion 102 engages the intermediate pinion 105 which is freely rotatable on a shaft 104, the intermediate pinion 105 being in engagement with the internal teeth of the rim gear 72b which rotates the sleeve 72 in the direction of the arrow 72c.

Since the bevel gear 59 is fixed to the shaft 26, this shaft is rotated in the direction of the arrow 26a. The shaft 26 transmits its motion to the automobile, through the reverse mechanism, and at the same time to a rim gear 82a on the rotatable sleeve 82 through two sets of helicoidal gears and one set of straight gears with an intermediate gear. This set of gears and their movements are the same as those described above for the rotation of the sleeve 72 and are shown in Fig. 4 and identified by the same reference numbers used in Fig. 2, except that in most, if not all cases, a prime has been added, particularly where the gears are referred to hereinafter. In Figs. 1a and 1b, it will be noted that the worm 65 corresponds to the worm 62a and that the gear wheel 97' corresponds to the gear wheel 97.

*Operation of the automatic transmission mechanism*

Assuming that the motor driving the shaft 10 is operating at a substantially constant speed, its power, equal to the speed multiplied by the force, is transmitted through the shaft 19 and distributed between the conical gears 62 and 59 of the differential in a flexible manner and proportional to the resistances offered by the vehicle and the springs 86, which regulate the compensated speed. When the gear 62, and the gearing connected therewith is at a higher speed than that of the gear 59 and the gearing connected therewith, the gear 62 has less power than the gear 59 and vice versa. The power and speed are compensated in this manner to equal the power of the motor. These observations do not take into account any possible power or speed losses due to friction and the operation of the mechanisms.

When the motor of the vehicle is started, with both the vehicle and the mechanisms stopped, the motor communicates its power through the clutch, in the manner described above, to the connecting shaft 19 and the cross head 61 carrying the satellite pinions 69, which are rotated in the direction of the arrow 19a. Since the conical gear 59 is connected by the shaft 26 and the reverse mechanism to the driving wheels of the vehicle, its rotation is prevented at first by the resistance of the inertia of the vehicle, therefore, these parts do not commence to rotate immediately. On the other hand, the bevel gear 62 starts rotation immediately in the direction of the arrow 19a and approximately twice as fast as the satellite pinions 69 and the shaft 19.

This rotation of the gear 62 causes rotation of the gearing connected therewith including the elements 62b, 97, 97a, 98, 102 and 105, by which motion is transmitted to the rotatable tubular sleeve 72 by means of its rim gear 72b. This sleeve is thereupon rotated in the direction of the arrow 72c (Fig. 1a) and since it is threadedly engaged by the thread provided by the balls 77, it tends to move axially toward the left. However, this thrust is taken up by the ball bearing unit 75 so that sleeve 72 is rotated in place. The rotation of the sleeve 72, because of the thread provided by the balls 77, applies a thrust to the tubular "nut" 80 displacing it to the right. At the beginning of the operation this displacement is effected without rotation, since the tubular member 80 is keyed to the tubular sleeve 82 which is initially immobile, because the conical gear 59 has not commenced to rotate, it being noted that gear 59 is connected by gearing with the sleeve 82 through the shaft 26 carrying the worm 65 engaging the gear 97', as shown in Fig. 1b, the latter gear being connected through the elements 97a', 98', 102', 105' to the rim gear 82a on the rotatable sleeve 82, in the manner shown in Fig. 4.

Under the conditions just described, the displacement of the tubular nut 80 toward the right compresses the springs 86 which control the compensated speed of the transmission mechanism. The power of these springs is controlled by resistances which are opposed to the running of the motor or rotation of the shaft 26. More particularly the power of the springs 86 is sufficient to overcome the force of the inertia of the stopped vehicle. The springs 86 are gradually compressed by the axial movement of the tubular nut 80 and when the gradual compression reaches the point of balance when the inertia of the stopped vehicle is overcome, the bevel gear 59 begins to rotate and the compression gradually decreases along with its movement to the right and therefore proportionately gradually decreases the revolutions of the conical gear 62. At that moment one may regard the mechanism as attaining its first or lowest speed ratio and from this point, the speed change is smooth and gradual, without noise and proceeds through an infinite number of intermediate speeds.

As the inertia of the vehicle is overcome, the bevel gear 59 commences to rotate and its speed increases during the gradual speed change referred to above, thereby rotating the shaft 26 in the direction of the arrow 26a to drive the vehicle. At the same time, the speed of the conical gear 62 decreases in proportion because of the differential action. It will be understood, of course, that the rotation of the shaft 26 as explained above, simultaneously effects the rotation of the tubular sleeve member 82, which in turn rotates the tubular "nut" 80. The rotation of the "nut" 80 is right-handed and as its rotation proceeds, it is displaced toward the left because of its threaded connection by the balls 77 with the rotating tubular sleeve 72, and the reaction of the springs 86.

The rotation of the tubular sleeve or "screw" 72 and the tubular nut 80 may be summarized by stating that while the "screw" 72 continues to rotate, it has a thrust to the right as it is in effect being unscrewed from the "nut" 80, whether the latter is rotating or not, and when the "nut" 80 is rotated, it in turn tends to thread itself onto the sleeve 72 resulting in an axial movement of the "nut" 80 back and forth, in some cases combined with relative rotation between the two parts.

When the "nut" 80 becomes stabilized, at a point more to the right of its starting position corresponding to that of the stopped vehicle, which point will be that of equilibrium between the power of the motor and the resistance of the vehicle, then the vehicle moves in direct drive.

Asssuming that the vehicle motor is running at a uniform driving speed, after having overcome the force of the inertia of the vehicle, and that the road is substantially level, the conical gears 59 and 62 will level off their speeds to approximately that of the shaft 19. When the conical gears 59 and 62 rotate at the speed of the shaft 19, the satellites 69 do not rotate on their shafts but rotate bodily with the shaft 19 and the cross head 61. Under these conditions the tubular "nut" 80 maintains a substantially stable axial position and continues to rotate with the rotatable sleeves 72 and 82. This situation will continue even if the speed of the motor is reduced somewhat, so long as it is traveling along a substantially level road.

When the vehicle starts to climb an upgrade, the increased resistance of the vehicle to the motor causes the conical gear 59 and the shaft 26 to gradually decrease in speed, as the speed of the vehicle is reduced, while at the same time the speed of the conical gear 62 gradually increases, so that the cycle of motions and operations described and explained above are repeated, as will be evident from the foregoing explanation.

If the automobile, operating on a level road as described above, is started downgrade, the effect of the kinetic energy of the vehicle causes the vehicle to exceed the speed of the motor, and since it offers little or no resistance, it causes the conical gear member 59 to rotate much faster than the conical gear 62, and in some cases may approach the speed of the shaft 19. Under these conditions the transmission takes what may be called an overdrive position, as distinguished from the normal direct drive position when the conical gears 59 and 62 have the same speed. Under these conditions of "overdrive," the tubular "nut" 80 is rotated faster than the tubular sleeve or "bolt" 72 with the result that the nut 80 threads onto the "bolt" 72 and its right end comes into engagement with or presses against the ball bearing unit 91 at the ring 90 which are both cushioned by the springs 95. The increased power and speed applied by the momentum of the vehicle is transmitted to the sleeve 82 which tends to drive the rotatable member 80 faster than the rotatable sleeve 72 so that the member 80 is threaded toward the left, as stated, but its thrust is cushioned by the springs 95 which eventually restrain the thrust. At this point the speeds of the members 82, 80 and 72 are equalized and the sleeve 80 applies a driving force to the sleeve 72 and the gear train connected therewith. If this operation continues appreciably the vehicle is braked quietly and effectively by the automatic operation of the clutch mechanism in the manner described above.

THE REVERSE MECHANISM

The reverse mechanism in shown to the right in Fig. 1b and included in the housing 22 secured to the block 58. The shaft 26 extending through the end block 58 transmits the power delivered by the transmission mechanism described above, to the reverse transmission provided with a power output shaft 28 extending axially through a supporting cover 23, secured to the housing 22, and a circular cover 24. The shaft 26 terminates at approximately the center of a cross head 27 of a differential gearing adjacent the end of the axially mounted shaft 28, the cross head 27 being mounted for free rotation on the adjacent end portions of these shafts. The cross head carries oppositely fixed shafts 29, each carrying a satellite pinion gear 39.

Two parts 30 in the form of quadrangular prisms provided with round central holes are located on the ends of the shafts 29. These parts extend into and are mounted in a drum portion 31a of a drum 31b, which in turn is mounted for free rotation relative to the shaft 28 on the hub of a bevel gear 32, meshing with the pinions 39, and on a ring 33 fixed to the shaft 28 by a cotter pin 35. The hub of the bevel gear 32 is keyed to the shaft 28 by a key 34. A bevel gear 37 is mounted on the shaft 26 opposite the bevel gear 32 and meshes with the pinions 39, the bevel gear 37 being keyed to the shaft 26 by a key 38. The hub of the bevel gear 37 extending around the shaft 26 is mounted in a ball bearing unit 36. The two satellite pinions 39 have an equal number of teeth, and the gears 32 and 37 meshing therewith also have the same number of teeth. All four of these gears of the differential may have the same number of teeth each.

The shaft 28, mounted in a ball bearing unit 25 in the cover 24, carries a cylindrical roller or sleeve 40, shown adjacent the ring 33, and this roller 40 is keyed or splined to the shaft by a key 41. The roller 40 is slidably mounted on the shaft 28 and carries a collar 47 for use in reciprocating the roller on the shaft 28.

The axial displacement of the cylindrical roller 40 is produced by a forked rod 43 pivoted on a pin 42 with the ends of the fork pivoted to the collar 47. The rod 43 is capable of being pivoted on the pin 42 in order to cause the roller 40 to be displaced from left to right and vice versa on the shaft 28. The lower end of the forked rod 43 terminates in a small fork 43a with slotted holes and is connected with a prismatic slide 45 by a pin 44.

At the right the slide 45 is provided with a slot 46 for receiving a forked operating lever, not shown, the prismatic slide 45 being biased to the position shown in Fig. 1b by means of a spring 46a.

The slide 45 at the left is provided with an upper inclined surface 47 engaged by a snap bolt 53 mounted in a cover 52 and biased downwardly by a spring 54. The snap bolt is retained and its downward movement limited by a washer 54a. When the slide 45 is pushed in the bolt 53 is raised and when it is retracted, the bolt 53, biased by the spring 54, moves down to the position shown.

The slidable roller 40 carries two diametrically opposed snap bolts 49 which normally assume the position shown under the bias of springs 48 held in place by set screws 50. The drum 31b opposite the position of the bolts 49 carries a plurality of pairs of blind holes 31c adapted to receive the projecting end portions of the bolts 49. As an example, there may be three pairs of regularly-spaced holes 31c for receiving the oppositely mounted bolts 49 when the slidable roller 40 is displaced to the left.

The peripheral portion of the drum 31b, as shown, is also provided with a considerable number of radially-extending through holes 31d arranged in a ring around the drum, any one of which is adapted to receive and accommodate a snap bolt 51 mounted in the housing and biased away from the drum 31b by a spring 55. The snap bolt 51 and the spring 55 are retained in the housing 22 by the cover 52, which is secured to the housing by means, not shown.

Operation of the reverse mechanism

Fig. 1b shows the reverse mechanism in the forward drive position with the slide 45 retained to the right by the spring 46a. In accordance with the usual practice, the vehicle is put in reverse, or in forward drive, when stopped. The neutral position of the transmission mechanism is automatically achieved by the clutch. The reverse mechanism is shifted to the reverse position by pushing the slide 45 to the left to the dotted line position shown for the lever 43. This may be done by a forked lever or other means acting in the slot 46 and connected to the dashboard of the vehicle by a suitable means, such as a push-pull or by an electromagnet operable by a switch on the dashboard.

While not shown and described, the electromagnet may be energized by the use of a photoelectric cell operated by the driver's movements. For example, in the standard driving motion, which most drivers habitually carry out when they intend to reverse a vehicle, the driver turns his head and part of his body so as to look back toward the place to which his car is to pass. A photoelectric cell is placed on each side of the driver or in other suitable positions for interruption by the driver when he turns his head and body. The details of such a mechanism are not shown but may be used to actuate an electromagnet for operating the slide 45.

For convenience the operation of the reverse mechanism is described in connection with a purely mechanical operation applied by the driver to the slide 45 through a lever or other suitable means connected to a push-pull button or other equivalent means on the dashboard of the vehicle. Such a means should be adapted to shift the slide in both directions, while the spring 46a is employed primarily to retain the slide in the forward driving position.

When the slide 45 is displaced toward the right to the position shown in Fig. 1b, the snap bolt 53 is lowered along the inclined plane 47 by the spring 54. This permits the lowering of the snap bolt or snap catch 51 out of one of the holes 31d under bias of the spring 55. Since the slide roller 40 is pushed to the left, the bolts 49 either enter or are biased to enter a pair of holes 31c as soon as the drum 31b starts to rotate. Rotation of the reverse mechanism as described is effected by rotation of the shaft 26 in the direction of the arrow 26a. The bevel gear 37 attached thereto is simultaneously rotated, and its motion is transmitted through the satellite pinions 39 to the drum 31b. As soon as the drum 31b starts to rotate, the snap bolts 49 enter one of the pairs of holes 31c and the drum 40 is locked to the shaft 28.

The foregoing operations effect a connection between the shaft 26 and the shaft 28 by means of the elements 37, 39, 32, 31b, 49 and 40, and the shaft 28 rotates in the same direction as the shaft 26 to give the vehicle a forward motion.

When it is desired to reverse the drive of the vehicle, the slide 45 is pushed to the left, which disengages the bolts 49 and engages the bolt 51 in one of the holes 31d in the drum 31b. The bolt 51 may not engage for the moment, but the spring 54 permits the upward movement of the bolt 53 so that engagement of the bolt 51 is secured an instant after rotation of the drum 51b is commenced.

After the reverse shift, the rotation of the shaft 26 in the direction of the arrow 26a is communicated to the differential gearing in the manner described above and to the drum 31b, but as the snap bolt 51 enters one of the holes 31d, further rotation of the drum 31b is prevented and the motion of the differential is transmitted by the bevel gear 32 directly to the shaft 28 to rotate it in a direction opposite to that of the shaft 26. Since the rotation of the drum 31d is prevented, the cross head 27 does not rotate and the satellite pinions 39 rotate in place.

ADVANTAGES OF THE AUTOMATIC TRANSMISSION MECHANISMS

Many of the advantages and improved results obtained by the use of the features of the present invention have been referred to in the foregoing description and others will be readily apparent to those familiar with the art.

The importance of the clutch elements for providing an automatic neutral position is particularly stressed because the clutch eliminates the necessity of a mechanical shift to neutral either in the clutch mechanism or in the transmission or reverse mechanisms. The invention also provides an easy means for shifting to reverse, since this is readily done as soon as the operator of the vehicle releases the accelerator. When stopping and parking the vehicle, it is not necessary to make any shift to neutral, but only to turn off the ignition and apply the hand brake. When it is desired to again start the vehicle, the operator merely starts the motor in the usual way, releases the hand brake and drives off without the setting of any mechanism or actuating a shift lever. A gradual and cushioned gear change is automatically achieved without any noise, jerks or interruptions.

Referring again to the clutch mechanism, it acts automatically to brake the vehicle by the motor when the accelerator pedal is released, and it is desired to reduce the speed of the vehicle. The clutch, therefore, not only acts as a positive forward or reverse drive, but is double-acting in its automatic operation to brake the vehicle by the motor.

The automatic transmission is a particularly advantageous construction, since it provides a smooth, cushioned speed change without any attention from the operator and without the use of selector rods, push buttons or shifting gears or other mechanisms. There are no steps, or abrupt speed changes, and the transmission, therefore, avoids shocks or jerks. The entire mechanism is relatively simple to manufacture, assemble and install, and it requires a minimum of maintenance and repairs, which in part at least, is a result of the smooth continuous operation in changing speeds. Since the mechanisms described are automatic to a maximum extent, it is not possible for the driver of the vehicle to make an error in the operation of the vehicle, even though the driver is somewhat unskilled or has no knowledge of the mechanisms involved.

The automatic mechanisms include relatively simple gearing and other structures through which there is no loss of power, and these mechanisms are of such a nature that they may be economically used in low-powered vehicles, such as small sports cars and motorcycles.

The reverse mechanism has particular advantages in cooperation with the transmission proper and the clutch mechanism because it operates in forward or reverse at the same speeds and the reverse drive is achieved in a gradual and smooth manner, the same as the forward drive. Furthermore, the clutch acts in reverse drive to brake the movement of the vehicle by the motor, the same as in forward drive.

Some of the mechanisms included in the preferred embodiment shown in the drawings may be changed without departing from the spirit and scope of the invention, as defined by the appended claims. For example, the gear train beginning with the elements 62a and 97 at the left in Fig. 1a may be modified and changed to carry out the functions and operations described in connection with this gear train, and similar changes may be made in the corresponding gearing beginning with the parts 65 and 97' in Fig. 1b. It is also to be understood that the cushioning arrangements between the gear trains referred to may also be modified to accomplish the results described, and the same is true of the specific means associated with the differential of the reverse mechanism and the clutching members of the clutch mechanism.

What I claim is:

1. In an automatic transmission mechanism including a clutch mechanism having an input and an output, a rotatable power input means connected into the input of the clutch mechanism, and a rotatable means connected into the output of the clutch mechanism, the improvement in which said clutch mechanism comprises a pair of cooperating rotatable clutching members, oppositely handed threaded connections respectively connecting said clutching members with the power input means and said rotatable means, centrifugally-acting means carried by the clutching member connected with the power input means and responsive to changes in the speed of the power input means for locking and unlocking said clutching member to the power input means, and a movable means for retaining the centrifugally-acting means in the locking position, said clutching members being movable into and out of engagement with each other in response to predetermined changes in the speed of the power input means.

2. An automatic transmission mechanism as claimed in claim 1, in which said threaded connections are arranged to effect engagement of the clutching members either when the power input means is operating at higher or lower speeds than said rotatable means, whereby the said rotatable means is adapted to be braked by the power input means.

3. An automatic transmission mechanism as claimed in claim 2, in which the power input means comprises a shaft provided with longitudinal grooves, radially-extending weighted bolts carried by said clutching member for engaging in said grooves, springs biasing said bolts toward said grooves, a roller on the outer end of each bolt, a slidable sleeve surrounding the rollers concentric with the input shaft, and means for shifting the sleeve longitudinally into and out of the path of the rollers.

4. An automatic transmission mechanism as claimed in claim 3, including a speed change transmission comprising a differential gearing having input and output connections respectively connected to said rotatable means and into a rotatable power transfer means, and a speed change cushioning means connected into the opposite sides of the differential gearing and operable in response to an increase in speed of either said rotatable means or said power transfer means relative to the speed of the other.

5. An automatic transmission mechanism as claimed in claim 4, including a reverse mechanism comprising a differential gear means having an input side connected to said power transfer means, an output side connected with a power output shaft and bodily rotatable satellite pinions, a rotatable member adjacent said shaft rotatable by the rotation of said pinions bodily, and means for selectively connecting said shaft with said rotatable member and for locking said member against rotation.

6. In an automatic transmission mechanism including a clutch mechanism, a rotatable power input means connected into the clutch mechanism, a rotatable means connected into the output of the clutch mechanism, said clutch comprising a pair of cooperating rotatable clutching members, and oppositely-handed threaded connections respectively connecting said clutch members with the power input means and said rotatable means, said clutching members being movable into and out of engagement with each other by means of said threaded connections in response to predetermined changes in the relative speeds of the power input means and said rotatable means.

7. An automatic transmission mechanism as claimed in claim 6, in which said clutching members are respectively male and female drums having conical-shaped engagement surfaces.

8. An automatic transmission mechanism as claimed in claim 7, including means for automatically locking the clutching member threadably connected to the power input means to prevent relative rotation and movement toward the other clutching member.

9. An automatic transmission mechanism as claimed in claim 8, including shiftable means for retaining the locking means in its locking position with respect to the rotatable power input means.

10. An automatic transmission mechanism as claimed in claim 9, in which the locking means includes locking members responsive to the centrifugal action of the rotatable power input means for releasing the locking means when the power input means is rotated above a predetermined speed.

11. In an automatic transmission mechanism including a clutch, a speed change transmission, a reverse mechanism, a rotatable power input means connected into the clutch mechanism, a rotatable means connecting the output of the clutch with the input of the transmission, a rotatable power transfer means connecting the output of the transmission with the reverse mechanism and a rotatable power output shaft connected into the reverse mechanism, said clutch comprising a pair of cooperating rotatable clutching members respectively connected with the power input means and said rotatable means, said clutching members being movable into and out of engagement with each other in response to predetermined changes in the relative speeds of the power input means and said rotatable means, said transmission including a differential gearing having input and output connections respectively connected to said rotatable means and said rotatable power transfer means, a speed-change cushioning means connected into the differential gearing and the power transfer means, a soft, gradual braking action being effected through said mechanisms when the speed of the power output shaft exceeds that of the power input means for an appreciable time.

12. An automatic transmission mechanism as claimed in claim 11, in which the reverse mechanism includes a differential gearing having input and output sides, means rigidly connecting the output side of the differential gearing of the transmission with the input side of the differential gearing of the reverse mechanism, and means rigidly connecting the rotatable power output shaft with the output side of the differential gearing of the reverse mechanism.

13. An automatic transmission mechanism as claimed in claim 12, in which each differential gearing includes a crosshead carrying satellite pinions, said rotatable means being rotatably connected with the crosshead of the differential gearing of the transmission while the crosshead of the differential gearing of the reverse mechanism is freely rotatable relative to the power transfer means and the power output shaft.

14. In an automatic transmission mechanism including a differential gearing having input and output connections, a rotatable power supply means connected with the input connection of the differential gearing and a rotatable power transfer means connected with the output connection of the differential gearing, a speed- and power-change cushioning mechanism, and separate gear trains respectively connecting the differential gearing and the power transfer means with opposite sides of the cushioning mechanism, said cushioning mechanism being responsive to changes in the relative speeds and forces applied through the differential gearing.

15. An automatic transmission mechanism as claimed in claim 14, in which the differential gearing includes a cross head carrying satellite pinions, said cross head being connected directly with said rotatable means for rotation thereby, and bevel gears at the opposite sides of the differential gearing meshing with said pinions, one of which is at the output side of the differential gearing and connected directly with said rotatable power transfer means and with one of the gear trains connected into the cushioning mechanism.

16. An automatic transmission mechanism as claimed in claim 15, in which the other bevel gear opposite the output side of the differential gearing is directly connected to the other gear train connected into the cushioning mechanism.

17. An automatic transmission mechanism as claimed in claim 16, in which the cushioning mechanism includes two separate rotatable sleeves respectively in driving connection with said separate gear trains, a third rotatable sleeve surrounding at least portions of said separate sleeves, means for keying said third sleeve to one of said separate sleeves, and a threaded connection between said third sleeve and the other separate sleeve.

18. An automatic transmission mechanism as claimed in claim 17, in which the cushioning mechanism includes means for resiliently acting on said third sleeve for absorbing movements of the third sleeve in opposite longitudinal directions.

19. An automatic transmission mechanism as claimed in claim 18, including a plurality of longitudinally extending rods carried by one of said separate sleeves and slidably arranged with respect to said third sleeve, and a compression spring on each of said rods biasing the third sleeve longitudinally with respect to the separate sleeve carrying the rods.

20. An automatic transmission mechanism as claimed in claim 19, in which the end of the third sleeve, threaded to one of said separate sleeves, bears against a ring biased by a plurality of compression springs, said third sleeve being movable longitudinally relative to said separate sleeves in response to changes in the rotational forces applied to said separate sleeves.

21. An automatic transmission mechanism as claimed in claim 14, in which the cushioning mechanism includes first and second rotatable members driven respectively by said separate gear trains, a third rotatable member operatively associated with said first and second rotatable members for longitudinal movement relative thereto, means for driving said third rotatable member by the second rotatable member to effect its rotation, a threaded connection between the third rotatable member and the first rotatable member adapted to effect longitudinal movement of the third rotatable member relative to the first rotatable member, and resilient means biasing said third rotatable member in opposite longitudinal directions.

22. An automatic transmission mechanism as claimed in claim 21, in which said first, second and third rotatable members are rotatable sleeves rotatable on an axis common with those of the rotatable power supply means and the rotatable power transfer means.

23. An automatic transmission mechanism as claimed in claim 22, in which the threaded connection between the first and third rotatable members includes facing correspondingly pitched threaded grooves in said first and third members and calibrated steel balls in said grooves.

24. In an automotive vehicle an automatic transmission mechanism including a clutch, a speed change transmission, a reverse mechanism, a rotatable power input means connected into the clutch mechanism, a rotatable means connecting the output of the clutch with the input of the transmission, a rotatable power transfer means connecting the output of the transmission with the reverse mechanism and a rotatable power output shaft connected into the reverse mechanism, said clutch comprising a pair of cooperating clutching members respectively connected with the power input means and said rotatable means, said clutching members being movable into and out of engagement with each other in response to predetermined changes in the relative speeds of the power input means and the rotatable means, means causing said members to automatically take a neutral position out of engagement with each other when the rotatable means stops rotating, said reverse mechanism including mechanism for shifting from direct drive to reverse drive including a differential gearing having input and output bevel gears, a freely rotatable cross head, satellite pinions carried by the cross head and meshing with said input and output bevel gears, the input bevel gear being connected with said rotatable power transfer means and the output bevel gear being connected with said rotatable power output shaft, and means for selectively connecting the cross head with said shaft and for stopping rotation of the cross head.

References Cited in the file of this patent

UNITED STATES PATENTS

| | | |
|---|---|---|
| 2,151,722 | Szekely | Mar. 28, 1939 |
| 2,226,661 | Grunstra | Dec. 31, 1940 |
| 2,893,524 | Ferrier | July 7, 1959 |